United States Patent [19]

Kindt-Larsen et al.

[11] Patent Number: 5,690,865
[45] Date of Patent: Nov. 25, 1997

[54] MOLD MATERIAL WITH ADDITIVES

[75] Inventors: Ture Kindt-Larsen, Holte, Germany; Jeffery Longo; Keith O'Brien, both of Jacksonville, Fla.

[73] Assignee: Johnson & Johnson Vision Products, Inc., Jacksonville, Fla.

[21] Appl. No.: 414,999

[22] Filed: Mar. 31, 1995

[51] Int. Cl.$^6$ ................................. B29D 11/00
[52] U.S. Cl. ................ 264/1.38; 425/808; 425/174.4; 249/134
[58] Field of Search ................ 264/1.38, 2.3, 264/300, 334, 337, 130; 249/117, 134; 425/808, 174.4

[56] References Cited

U.S. PATENT DOCUMENTS

| | | |
|---|---|---|
| 2,965,589 | 12/1960 | Price . |
| 3,423,488 | 1/1969 | Bowser . |
| 3,424,607 | 1/1969 | Coscia ........................ 264/338 |
| 3,821,333 | 6/1974 | Goodwin et al. . |
| 3,935,292 | 1/1976 | Okubo et al. . |
| 4,159,292 | 6/1979 | Neefe . |
| 4,311,654 | 1/1982 | Blandin ........................ 264/2.3 |
| 4,534,916 | 8/1985 | Wichterle ........................ 264/2.3 |
| 4,622,347 | 11/1986 | Fudge . |
| 5,417,557 | 5/1995 | Ross et al. ........................ 264/334 |

FOREIGN PATENT DOCUMENTS 39-6835  5/1964  Japan .

OTHER PUBLICATIONS

Kirk Othmer, *Encyclopedia of Chemical Technology*, 3rd Edition, vol. 1., pp. 1-9, John Wiley & Sons, 1978.

*Primary Examiner*—Mathieu D. Vargot

[57] ABSTRACT

The present invention is directed to a composition comprising polystyrene with at least 0.1% (w/w) of an additive, the article of manufacture thereof, such as a mold for making contact lenses and the mold assembly containing said mold, and the use of such mold so to facilitate demolding from a two mold assembly in the process of making contact lenses.

28 Claims, 4 Drawing Sheets

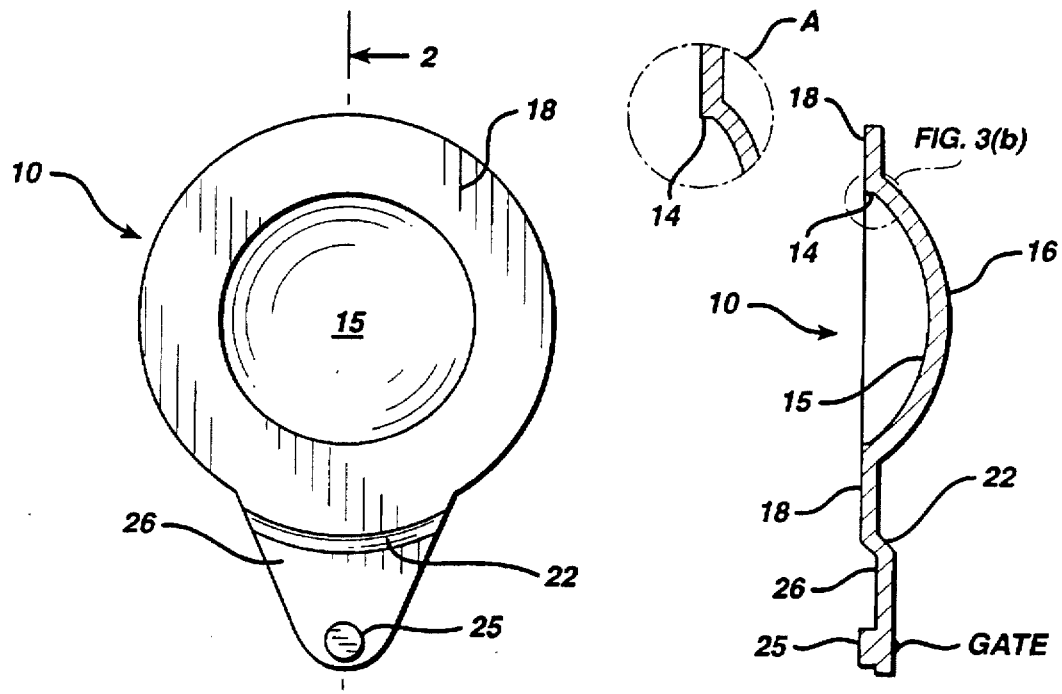
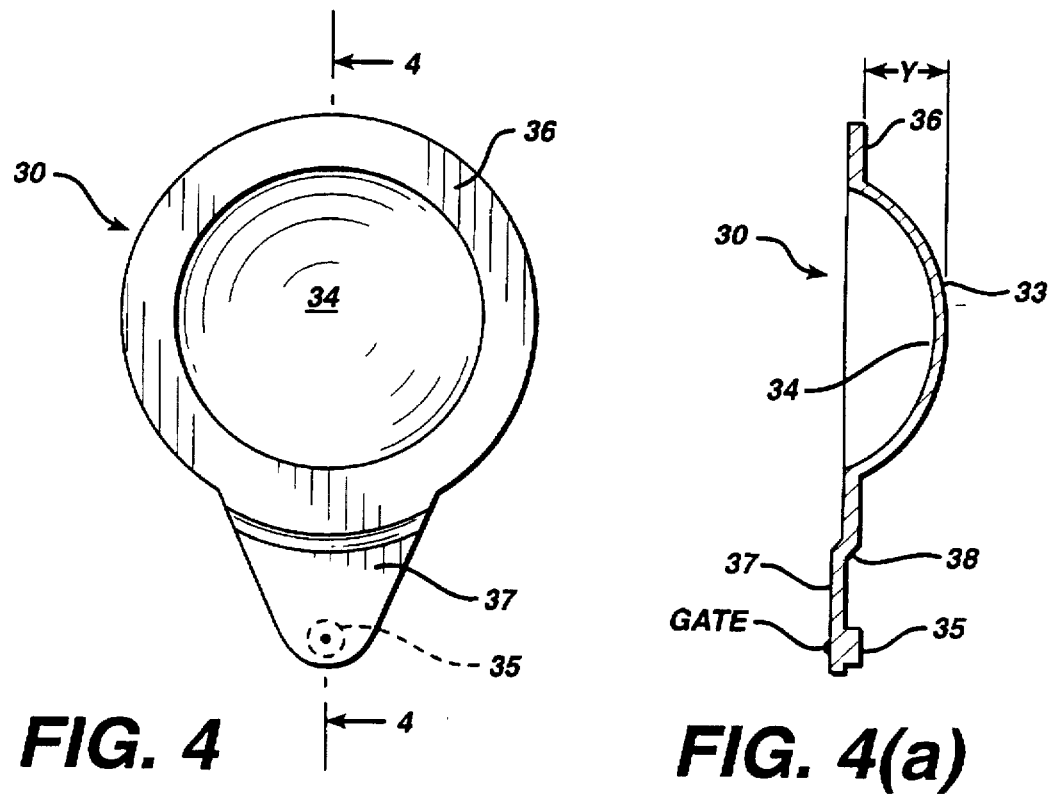

CAVITY/1 CAVITY/5
CAVITY/2 CAVITY/6
CAVITY/3 CAVITY/7
CAVITY/4 CAVITY/8

BASE CURVE FRAME

MOLD MATERIAL WITH ADDITIVES

BACKGROUND OF THE INVENTION

FIELD OF THE INVENTION

The present invention relates to a novel polymeric formulation containing an internal mold release additive or surfactant which assists in the release from each other of mold components from a multi-part mold employed in the molding of polymeric articles, such as soft contact lenses. The present invention is also directed to the molds made from such polymeric formulation as well as to a method of releasing the mold components from each other.

BACKGROUND OF THE INVENTION

An extensive array of methods is currently utilized in the manufacture of hydrophilic polymer articles, such as soft contact lenses. A considerable variety of techniques have been employed, such as spin casting, static cast molding, lathing, and a combination of casting and lathing, and particularly through the use of two part molds. Generally, such mold parts for hydrophilic contact lenses consist of a curvilinear (concave/convex) center of front curve mold part adapted to form, in cooperation with a mating base mold curve part, a two part mold for the contact lenses. These hydrophilic contact lenses are usually constituted from a hydrophilic polymer, preferably a HEMA-based polymer (hydroxy-ethylmethacrylate), among numerous other materials.

The components of the mold within which the hydrophilic polymer contact lenses are molded may consist of suitable pallets, each including a plurality of cavities receiving mold parts having female and/or male base surfaces or curvilinear mold portions for the formation of the curved contact lenses. The molds, as described, for instance in the molding technology, may be constituted from suitably selected conventional plastic materials, whereby the hydrophilic polymer articles, i.e., the contact lenses, will be formed in the cavity therebetween, and may possibly adhere to one or both of the mold parts. In the utilization of separable two part molds for the molding of hydrophilic contact lenses, upon completing the molding step, it is of critical importance to be able to release the hydrophilic contact lenses from their surface engagement without adherence to the mold parts or at least one of the mold halves and to separate the mold part without causing damage to the contact lenses which would render the lenses unusable. Various means employed for effectuating the release of hydrophilic contact lenses from surfaces of molds, particularly two part molds which are intended to be physically separated, are through the employment of laser or infrared heat mold separating devices, the use of external heat and/or the application of heated gas, hot air or steam. However, all too frequently, damage is sustained by the contact lenses during the demolding operation. The potential damage which generally renders the contact lenses unable to meet necessary quality and/or inspection standards may consist of edge tears and chips, nicks or other surface defects formed in the contact lenses. Another cause of rejected lenses are "holes", i.e., voids in the center of the cast that are developed in the lenses during the molding process.

U.S. Pat. No. 4,159,292 to Neefe discloses a means for controlling the release of cast polymeric optical lenses from a resinous optical mold by coating the resinous mold material particles with a release agent before forming the resinous material with a lens mold. These release agents, e.g., silicone oil, polyvinyl alcohol, steric acid, fluorocarbons and waxes, are external additives to the mold resins. As such they suffer from the disadvantage of being easily washed off the surface of the mold resin and thus exhibit a tendency to be retained on the lens material. In addition, these additives are not distributed evenly in the mold. Thus, the ease of separation of the lens material from the mold resin varies depending upon the distribution. In some areas of the mold, there may be less resistance, while in others, there may still be friction forces between the surfaces. Thus, using this methodology, there may be a slight improvement, but even so, the lenses frequently develop the defects described herein.

As a result there is a need to find a new formulation for the mold that would facilitate the demolding process, so as to minimize the risk of damage to the contact lenses upon demolding and also would reduce the risk of holes in the lens.

The present invention accomplishes these goals by utilizing an alternative material for one of the mold parts. This new formulation has the advantage of greatly reducing the adhesion forces between the lenses and the mold part, thereby facilitating the release of the mold material and minimizing the risk of developing defects in the lens caused by and during the demolding process. In addition, this new material has the added advantage of reducing the tendency to form holes in the contact lenses.

SUMMARY OF THE INVENTION

Accordingly, in order to improve upon the ability of such hydrophilic polymeric articles, especially hydrophilic polymeric contact lenses of being inherently releasable in an undamaged state from its mold cavities of two mold structures in which they are molded, the present invention contemplates making one of the mold structures of a new formulation. The present invention provides for the formulation of a lens mold material with an internal mold release agent or surfactant. This provides improved and substantially uniform distribution of the additive across the surface of the mold resin and decreased probability that the additive would be retained on the lens. Consequently, the adhesion forces between the surfaces is greatly reduced, thereby minimizing the risks for the defects described hereinabove.

This formulation is a molding resinous thermoplastic polymer of either polystyrene or polypropylene. This additive is a surfactant or mold release agent, such as waxes, and soaps and oil. More particularly the additive is a propylene wax having a molecular weight ranging from 5,000-200,000, a polyethylene wax having a molecular weight of 5,000-200,000, a fatty acid having 5-26 carbon atoms, a hydrocarbyl carboxylic acid amide having a molecular weight of 200-2,000, a glycerol ester having a molecular weight of 200-2,000, salts of stearic acid, silicones having a molecular weight of 2,000 to 100,000, Montan wax, complex ester, oxidized waxes, or combinations thereof.

This formation admixed with and impregnated with at least 0.1% of an internal additive (w/w). When this material was used to make one of the mold halves in the mold assembly for making the contact lenses, it was found that fewer lenses were formed having the defects described hereinabove. Thus, an aspect of the present invention is directed to the mold half comprised of this new formulation. This mold half is part of the mold assembly, and therefore another aspect of the present invention is directed to the mold assembly comprising said mold half comprised of the formulation of the present invention.

The mold assembly comprises at least two pieces, a female concave piece (front piece) and a male convex piece (back piece), forming a cavity therebetween, and when said pieces are mated, at least one piece having a flange thereabout. More particularly the mold assembly comprises a front mold half and a back mold half in contact therewith, thereby defining and enclosing a cavity therebetween, and a polymerizable composition in said cavity in contact with said mold halves, the front mold of which has a central curved section with a concave surface, a convex surface and a circular circumferential edge, wherein the portion of said concave surface in contact with said polymerizable composition has the curvature of the front curve of a contact lens to be produced in said mold assembly and is sufficiently smooth that the surface of a contact lens formed by polymerization of said polymerizable composition in contact with said surface is optically acceptable, said front mold also having an annular flange integral with and surrounding said circular circumferential edge and extending therefrom in a plane normal to the axis and extending from said flange, while the back mold has a central curved section with a concave surface, convex surface and circular circumferential edge, wherein the portion of said convex surface in contact with said polymerizable composition has the curvature of the back curve of a contact lens to be produced in said mold assembly and is sufficiently smooth that the surface of a contact lens formed by polymerization of the polymerizable composition in contact with said surface is optically acceptable, said back curve also having an annular flange integral with and surrounding said circular circumferential edge and extending therefrom in a plane normal to the axis of said convex structure, and a generally triangular tab situated in a plane normal to said axis and extending from said flange, wherein the convex structure of said back mold half contacts the circumferential edge of the front mold half.

The inner concave surface of the front mold half defines the outer surface of the contact lens, while the outer convex surface of the base mold half defines the inner surface of the contact lens which rests upon the edge.

In this assembly, either the back mold or the front mold half or both is comprised of the novel formulation of the present invention. However, it is the back mold half that is preferably comprised of the novel formulation of the present invention, while the front curve mold is comprised of a thermoplastic material that does not contain the additive. Thus another aspect of the present invention is directed to the base mold comprised of said novel formulation.

The mold assembly with the base curve mold made up of the polystyrene/additive or polypropylene/additive formulations of the present invention are used in making soft contact lenses. Thus, another aspect of the present invention is directed to the process of making soft contact lenses utilizing the mold assembly. As described herein, the use of the polystyrene/additive formulation facilitates the release of the mold from the polymerized polymer comprising the contact lens and the front mold.

Another aspect of the present invention is directed to a process of minimizing and/or preventing chips, holes or tears in the contact lens formed in the molds by utilizing a lens mold comprised of the polymeric formulation of the present invention.

BRIEF DESCRIPTION OF THE DRAWINGS

The present invention may be more readily understood by one skilled in the art with reference being had to the following detailed description of several preferred embodiments thereof, taken in conjunction with the accompanying drawings wherein like elements are designated by identical reference numerals throughout the several views.

FIGS. 3 and 3(a) are respectively, a top or planar view and an elevation of side view of one embodiment of a first (female) or front curve mold half molded pursuant to the present invention.

FIG. 3(b) is an enlarged detail of a portion of FIG. 3(a).

FIGS. 4 and 4(a) are respectively a top or planar view and an elevation or side view of one embodiment of a second (male) or back curve mold half molded pursuant to the present invention.

DETAILED DESCRIPTION OF THE PRESENT INVENTION

Figure 1:
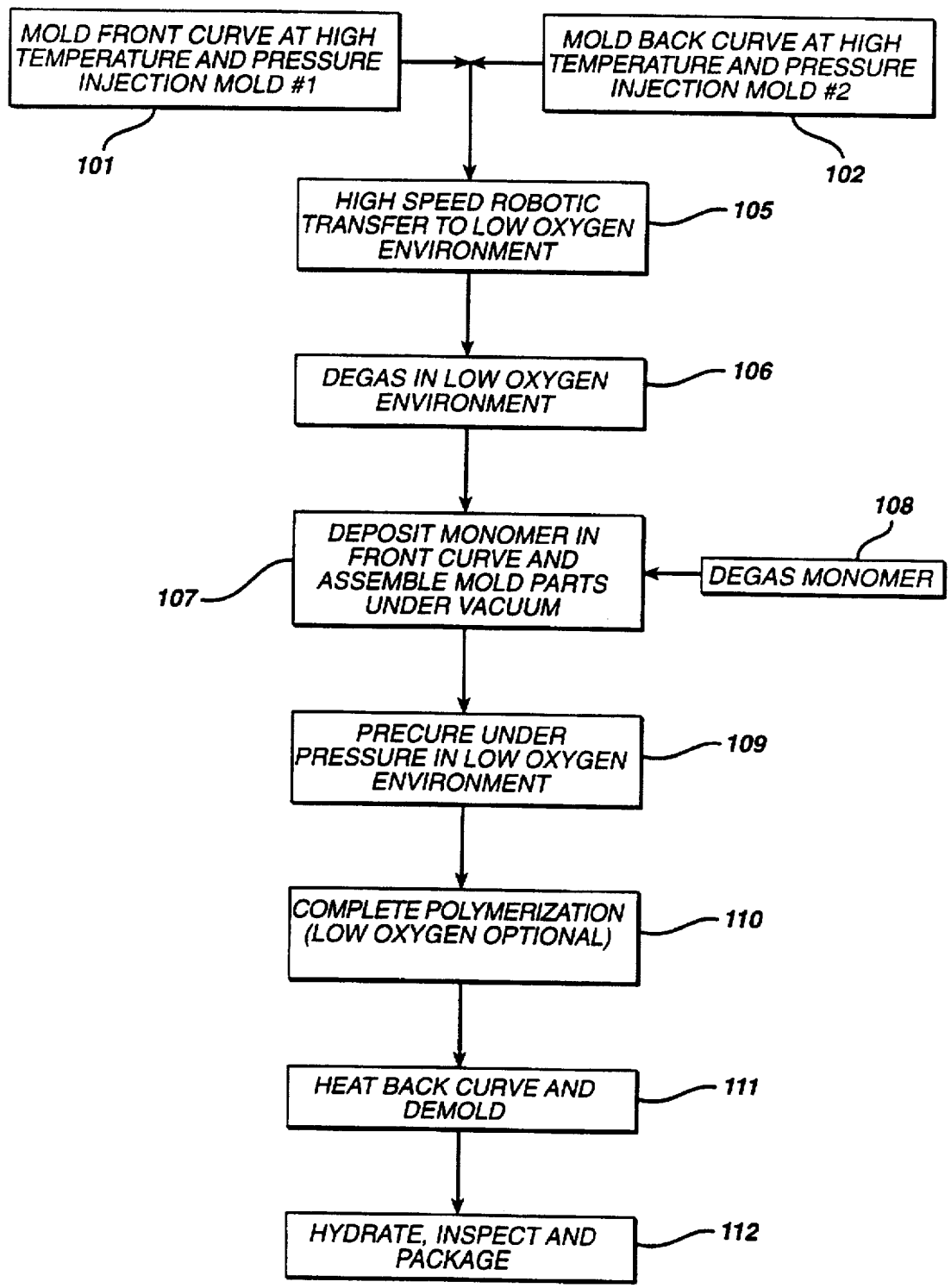
FIG. 1 is a flow diagram of the continuous process for contact lens production, including molding, treatment and handling of the molds and contact lenses in a low oxygen environment.

The additives used in the present invention are materials that are known or commercially available.

As used herein, the term "silicones" is a term applied to a range of materials based upon a silicon oxygen polymer backbone with a carbon containing side chain of hydrocarbyl groups containing 1–6 carbon atoms. More specifically, it consists of a polymer having a structure consisting of alternate silicon and oxygen atoms of the formula:

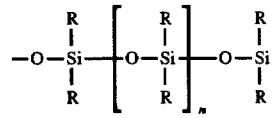

wherein each R may be different, but preferably the same and are a hydrocarbyl group and n is an integer ranging from 20 to about 1500. The molecular weight of the silicone range from 2000 to 100,000 g/mole, inclusive. The silicone have very low surface tension, preferably 22–24 mN/m or dyn/cm. In addition, the silicones contemplated for use by the present invention are physiologically inert. They are stable, heat resistant, chemically inert, colorless and odorless. The term silicones includes among other things, silicone oil and silicone wax. Examples include ABILWAX 9800 and 9801, L-42, L-45, NM-1, VISC-10M, SF96, SF1080, SF18-850 DOW CORNING 200, 203, 230, KANTSTIK 406 NOO, KANTSTIK M-55, silicone wax (steroyldimethicone), dimethyl silicone, and the like.

Stearates are salts of stearic acid. They include ammonium salts and metal salts thereof. "Metal stearates" as used herein are the metal salts of stearic acid. These metals include alkali metals, alkaline earth metals, Group 13 metals, Group 14 metals and transition metals, such as Group 12. Example of the metals include zinc, sodium, calcium, lead, barium, cadmium, aluminum, lithium, and the like. Examples include HYTECH RSN 248D, PETRAC CP-11LS, PETRAC CP-115G, PETRAC 22, PLASTOLUBE, SYN PRO CALCIUM STEARATE PG, SYN PROTYPE 114-36, WITCO F, WITCO EXTRA DENSE G, WITCO FP, COMETALS SODIUM STEARATE, SYNPRO SODIUM STEARATE ST, WITCO HEAT STABLE, INTERSTAB ZN-18-1, PETRAC ZN-4, MATHE CALCIUM STEARATE, MILJAC CALCIUM STEARATE, WITCO CALCIUM STEARATE, MATHE SODIUM STEARATE, WITCO SODIUM STEARATE, WITCO T-1, COAD 20, 21, 23, 26 USP, 27B, 27D, 27F, HYTECH RSN 1S31, MATHE ZINC STEARATE S, MATHE ZINC STEARATE 25S, MILJAC ZINC STEARATE, WITCO ZINC STEARATE, PLASTOLUBE, SYNPRO ACF, STNPRO 8, WITCO 42, WITCO 11, and the like.

As used herein, amide waxes are waxes having the formula $R_1CONH_2$ wherein $R_1$ is a hydrocarbyl radical and $R_1CONH_2$ has a molecular weight ranging from about 200 to about 2000 g/mole. There may be complete saturation in $R_1$ or there may be at least one double bond between the carbon atom in $R_1$. The amide waxes preferably have up to 40 carbon atoms, although it is preferred that the amide waxes contain from 12–30 carbon atoms. The amide waxes also include higher fatty acid amides, that is, fatty acids having an even number of carbon atoms, ranging from 12–30 carbon atoms. Examples include CRODAMIDE ER, CRODAMIDE OR, CRODAMIDE SR, CRODAMIDE 203, CRODAMIDE 212, EURESLIP 58, KEMAMIDE E, PARICIN 285, PARICIN 220, PETRAC ERMIDE, PETRAC SLIP-EZE, PETRAC VIN-EZE, PETRAC SLIP-QUICK, ACRAWAX C (1,2-ethanediylbisoctadecanamide), ADWAX 280, EBS WAX, HOSTALUB FA1, PARACIN 285, ROSSWAX 140, CRODAMIDE EBS, BUSPENSE 047, ER, OR, 203, 212, KEMAMIDE B, S, U, ethylene bis (stearamide), oleamide, erucamide, and the like.

Examples of a fatty acid are CROD ACID, stearic acid, and the like.

Polyethylene and propylene waxes as used herein are waxes of low, medium or high density of polyethylene and propylene respectively having a molecular weight ranging from about 5000 to 200,000 g/mole. Examples of polyethylene wax include EPOLENE C-13, C-14, C-15, C-17, C-18, E-10, N-10, N-11, N-21, N-34, HOECHST WAX PE 190, STANWAX, and the like. Examples of propylene wax are EPOLENE N-15P, and EPOLENE E-43P, and the like.

Other waxes, such as mineral wax, e.g., Montan wax can also be used. Montan wax contains three portions, the wax portion, the resin portion and the asphalt portion. The wax component of Montan is a mixture of long-chain ($C_{24}$–$C_{30}$) esters (62–68 wt %), long chain acids (22–26 wt %), and long-chain alcohols, ketones and hydrocarbons (7–15 wt %). The resin portion is approximately 70 wt % terpenes and polyterpenes and 30 wt % resinic acid and oxyresinic acid, while the asphalt portion is believed to be polymerized esters of oxyresinic acid.

Oxidized waxes are alkan hydrocarbons (paraffins) having a molecular weight of 100–2000 g/mole. They are capped at the ends with either ester, carboxylic or hydroxy groups. Examples include carnauba wax and Rosswax, such as Rosswax 100 and 1343 and the like.

As defined herein, glycerol esters are hydrocarbyl esters of glycerol having a molecular weight of 200 to 2000 g/mole. They include monoglycerides, diglycerides and polyglycerides, including fatty acids of triglycerides. Examples include PATIONIC 900, 901, 902, 907, 919, 1042 and 1042 K, and the like.

Alcohol esters contain 5–2000 carbon atoms, and include such species as LUBE 106, and the like.

Complex esters are copolymers of organic phosphate esters having a molecular weight of 200–2000 g/mole which contain glycerides, organic acid derivatives and fatty acids. Examples include KANTSTIK FX-9 and Q, and the like.

Combination of the additives listed hereinabove or blends include MOLD EASE PCR, MOLD WIZ INT 33 PA, INT 38 H, INT 33 UDK, and the like. It is preferred that the combination have a molecular weight ranging from 200 to 200,000 g/mole.

As defined herein, hydrocarbyl is an aliphatic, cyclaliphatic, or aromatic moiety containing carbon and hydrogen atoms, having 1 to 200 carbon atoms. The hydrocarbyl moiety may be straight chain, or branched or cyclic. If cyclic, the rings are preferably fused. The hydrocarbyl group may be completely saturated or partially saturated or completely aromatic or conjugated. The hydrocarbyl moiety may contain at least one double bond. It is preferred that the hydrocarbyl group contains 1–100 carbon atoms.

As described hereinabove, the present invention is directed to a new polymeric material containing an additive admixed therewith. The polymeric material of the present invention is a thermoplastic material, viz., polystyrene or polypropylene. The polystyrene and polypropylene that is utilized is transparent to ultraviolet light. When the additive described hereinabove is admixed with the polystyrene or polypropylene, the new formulation maintains its ability to transmit ultraviolet light. In a preferred embodiment, the new formulation allows UV transmissions of from 3 to 5 up to wavelengths of 300 nanometers.

The additive admixed with the thermoplastic material is present in amounts of at least about 0.1% by weight. As described hereinbelow, the additive is thoroughly mixed with the thermoplastic material so as to form a matrix. In other words, these are internal stet additives and do not coat the thermoplastic material. As such, the additive is relatively uniformly distributed in the thermoplastic material. Theoretically there is no upper limit to the amount of additives added to the mold half, as long as one of the mold halves maintains its transmission to UV light. Typically, as a practical matter, additives up to about 20% are useable. In a preferred embodiment, the additive should be present in amounts ranging from about 0.1% to about 5% by weight and more preferably from about 0.1% to about 2% by weight.

The additive is basically an oil, soap, wax, i.e., a mold release agent and/or surfactant. It is preferably a silicone oil, stearates, e.g., zinc stearates, or wax, but is not limited thereto. The preferred additives are SF 1080 Silicone Oil, Int 38H Ester Complex, Kantstik Q Ester Complex, FC 430 Ester Complex, ABIL® Wax 9801, Silicone Wax (stearyl dimethicone), SF 96-5 Silicone Oil, L-42, Calcium Stearate, Sodium Stearate, Acrawax® C (1,2 ethanediylbis-octadecanamide), polystyrene 202, FC 4331 Ester Complex, SF 18-350 Silicone Oil, L-45 (dimethyl silicone), Zinc stearate, ABIL® wax 9801 (cetyl dimethicone), VSC-10M, Carnauba Wax and Ross Wax 100. The more preferred additives are SF 1080 Silicone Oil, Int. 38H Ester Complex, Kantstick Q Ester Complex, FC 430 Ester Complex and Abilwax 9801 Silicone Oil. The most preferred additives are SF 1080 and Abilwax 9801.

Exemplary formulations include polystyrene or polypropylene with the following additives in the indicated amounts.

| ADDITIVE | AMOUNT BY WEIGHT |
| --- | --- |
| ABILWAX 9801 | 0.25% |
| ABILWAX 9801 | 1.00% |
| FC 430 | 0.25% |
| KANTSTICK Q | 0.25% |

-continued

| ADDITIVE | AMOUNT BY WEIGHT |
|---|---|
| KANTSTICK Q | 1.50% |
| SF 1080 | 0.5% |
| SF 1080 | 0.25% |
| AXEL 33 P/A | 0.25% |
| AXEL 33 P/A | 2.50% |
| AXEL 33-H | 0.25% |
| AXEL 38-H | 2.5% |
| GE 1080 | 0.5% |
| GE 1080 | 0.25% |

The polystyrene/additive and polypropylene/additive compositions of the present invention are prepared by processes well known to those skilled in the art. The following procedure exemplifies the techniques used to make the composition of the present invention using polystyrene. However, the techniques are just as applicable for making the polypropylene/additive composition.

The procedure using polystyrene as the thermoplastic material is as follows. The polystyrene and the additive are mixed together by techniques known to one skilled in the art. In one methodology, the polystyrene is compounded with the additive. In other words, a predetermined amount of the additive and polystyrene are mixed together, the mixture is heated to melt the polystyrene, the melted polystyrene and the additive are then again mixed together, such as with an extruder, which further intermixes the two components. The mixture can then be repelletized in a pelletizer. Alternatively, the polystyrene may first be melted to form the molten polystyrene and the additive added to the molten polystyrene in the mixer, e.g., extruder and mixed together and then repelletized with the pelletizer. Alternatively, the additive can be compounded with the thermoplastic material directly in the molding machine.

The composition of the present invention is utilized to replace articles of manufacture wherein polystyrene or polypropylene is normally utilized. In one such application, the composition of the present invention is employed to comprise a mold half of a separable two part mold assembly utilized in the preparation of soft contact lenses. The mold is comprised of at least two pieces, a female, concave piece and a male convex piece, forming a cavity therebetween, when such pieces are mated, with at least one flange thereabout. At least one of the pieces is comprised of the composition of the present invention. In other words, both mold halves or one mold half is comprised of the composition of the present invention. When only one mold half is comprised of the composition of the present invention, the other mold half is comprised of a thermoplastic polymer that is normally used to make mold halves for contact lenses, as described hereinbelow. It is preferred that the base mold half be comprised of the composition of the present invention.

A preferred mold assembly is depicted in FIGS. 3 and 3a, which illustrate respectively top elevational and side views of one embodiment of a front mold half 10 useful in the production of a contact lens by the polymerization of a polymerizable composition in a mold assembly composed of two complementary front and base mold halves. As indicated, the mold halves are useful in the production of contact lenses in that lenses can be made which are immediately ready to wear, and in that unswelled lenses can be made which need to be swelled (hydrated) to be ready to wear.

Although as indicated above, the front mold half may be comprised of the present composition, it is preferred that the front mold half 10 is formed of a suitable thermoplastic polymer which is sufficiently transparent to ultraviolet light to allow irradiation therethrough with light to promote the subsequent polymerization of a soft contact lens. Examples of suitable materials include polyolefins such as low, medium, and high density polyethylene, polypropylene, including copolymers thereof; poly-4-methylpentene; and polystyrene. Other suitable materials are polyacetal resins, polyacrylethers, polyarylether sulfones, nylon 6, nylon 66 and nylon 11. Thermoplastic polyesters and various fluorinated materials such as the fluorinated ethylene propylene copolymers and ethylene fluoroethylene copolymers may also be utilized. Other materials that can be utilized for the front mold half are described in U.S. Pat. No. 4,565,348, the contents of which are incorporated by reference. The most preferred material for the front mold half is polystyrene or polypropylene.

The front mold half 10 defines a central curved section with an optical quality concave surface 15, which has a circular circumferential parting edge 14 extending therearound. The parting edge 14, shown in enlarged detail in FIG. 3(b), is desirable to form a sharp and uniform plastic radius parting line (edge) for the subsequently molded soft contact lens. A generally parallel convex surface 16 is spaced from the concave surface 15, and an annular essentially uniplanar flange 18 is formed extending radially outwardly from the surfaces 15 and 16 in a plane normal (perpendicular) to the axis (of rotation) of the concave surface 15. The concave surface 15 has the dimensions of the front curve (power curve) of a contact lens to be produced by the front mold half, and is sufficiently smooth such that the surface of a contact lens formed by polymerization of a polymerizable composition in contact with the surface is of optically acceptable quality. The front mold half is designed with a thinness (typically 0.8 mm) and rigidity effective to transmit heat therethrough rapidly and to withstand prying forces applied to separate the mold half from the mold assembly during demolding.

The front mold half or curve thickness was reduced from 1.5 mm in prior designs to 0.8 mm. This has a direct impact on cycle time reduction.

FIGS. 4 and 4(a) illustrate respectively top elevational and side views of one embodiment of a second, or back curve mold half 30. The back curve mold half is designed with all of the same design considerations mentioned hereinabove with respect to the front curve mold half 10.

The back curve mold half 30 is formed of the composition of the present invention (i.e., polystyrene with additive or polypropylene with additive). The composition of the present invention is preferably transparent to visible or ultraviolet light. The back curve mold half 30 defines a central curved section with an optical quality convex surface 33, a generally parallel concave surface 34 spaced from the convex surface 33, and an annular essentially uniplanar flange 36 formed extending radially outwardly from the surfaces 33 and 34 in a plane normal to the axis (of rotation) of concave surface 34. The convex surface 33 has the dimensions of the rear curve (which rests upon the cornea of the eye) of a contact lens to be produced by the base mold half, and is sufficiently smooth such that the surface of a contact lens formed by polymerization of a polymerizable composition in contact with the surface is of optically acceptable quality. The base mold half is designed with a thinness (typically 0.6 mm) to transmit heat therethrough rapidly and rigidity effective to withstand prying forces applied to separate the mold half from the mold assembly during demolding.

The mold halves 10,30 define generally triangular tabs 26,37 integral with the flange which project from one side of the flange. The tab 37 extends to the injection hot tip which supplies molten thermoplastic to the mold; and also defines therein an angled (e.g., 45°) web sections 22,38 for smoothing the flow of the polymer wave front and thus to avoid jetting, sink marks, weld lines and other undesirable flows which would impair the optical quality of the mold half. The mold halves 10,30 also define a small circular projections 25,35 which serve as traps in the molding process to immobilize small plugs of colder polymers that may form at the injection hot tip between cycles.

The monomer and monomer mixtures to which this process may be directed include copolymers based on 2-hydroxyethylmethacrylate ("HEMA") and one or more comonomers such as 2-hydroxyethyl acrylate, methyl acrylate, methyl methacrylate, vinyl pyrrolidone, N-vinyl acrylamide, hydroxypropyl methacrylate, isobutyl methacrylate, styrene, ethoxyethyl methacrylate, methoxy triethyleneglycol methacrylate, glycidyl methacrylate, diacetone acrylamide, vinyl acetate, acrylamide, hydroxytrimethylene acrylate, methoxyethyl methacrylate, acrylic acid, methacryl acid, glyceryl methacrylate, and dimethylamino ethyl acrylate.

Preferred polymerizable compositions are disclosed in U.S. Pat. No. 4,495,313 to Larsen, U.S. Pat. No. 5,039,459 to Larsen et al. and U.S. Pat. No. 4,680,336 to Larsen et al., which include anhydrous mixtures of a polymerizable hydrophilic hydroxy ester of acrylic acid or methacrylic acid and a polyhydric alcohol, and a water displaceable ester of boric acid and a polyhydroxyl compound having preferably at least 3 hydroxyl groups. Polymerization of such compositions, followed by displacement of the boric acid ester with water, yields a hydrophilic contact lens. The mold assembly of the present invention described herein may be used to make hydrophobic or rigid contact lenses, but the manufacture of hydrophilic lenses is preferred.

The polymerizable compositions preferably contain a small amount of a cross-linking agent, usually from 0.05 to 2% and most frequently from 0.05 to 1.0%, of a diester or triester. Examples of representative cross linking agents include: ethylene glycol diacrylate, ethylene glycol dimethacrylate, 1,2-butylene dimethacrylate, 1,3-butylene dimethacrylate, 1,4-butylene dimethacrylate, propylene glycol diacrylate, propylene glycol dimethacrylate, diethylglycol dimethacrylate, dipropylene glycol dimethacrylate, diethylene glycol diacrylate, dipropylene glycol diacrylate, glycerine trimethacrylate, trimethylol propane triacrylate, trimethylol propane trimethacrylate, and the like. Typical cross-linking agents usually, but not necessarily, have at least two ethylenically unsaturated double bonds.

The polymerizable compositions generally also include a catalyst, usually from about 0.05 to 1% of a free radical catalyst. Typical examples of such catalysts include lauroyl peroxide, benzoyl peroxide, isopropyl percarbonate, azobisisobutyronitrile and known redox systems such as the ammonium persulfate-sodium metabisulfite combination and the like. Irradiation by visible light, ultraviolet light, electron beam or a radioactive source may also be employed to catalyze the polymerization reaction, optionally with the addition of a polymerization initiator. Representative initiators include camphorquinone, ethyl-4-(N,N-dimethylamino) benzoate, and 4-(2-hydroxyethoxy)phenyl-2-hydroxyl-2-propyl ketone.

Polymerization of the monomer or monomer mixture in the mold assembly is preferably carried out by exposing the composition to polymerization initiating conditions. The preferred technique is to include in the composition, initiators which work upon exposure to ultraviolet radiation; and exposing the composition to ultraviolet radiation of an intensity and duration effective to initiate polymerization and to allow it to proceed. For this reason, the mold halves are preferably transparent to ultraviolet radiation. After the precure step, the monomer is again exposed to ultraviolet radiation in a cure step in which the polymerization is permitted to proceed to completion. The required duration of the remainder of the reaction can readily be ascertained experimentally for any polymerizable composition.

As indicated at step 108 in FIG. 1, the monomer or monomer mixture is degassed prior to the filling of the front curve mold half in order to remove dissolved gases. $O_2$ is removed because of its deleterious effect on polymerization as noted above. Other gases, including $N_2$, are removed to avoid the formation of gas bubbles when the monomer is expelled from the relatively high pressure of the pump line which supplies the fill nozzle, to encounter the atmospheric or subatmospheric $N_2$ pressure of the filling and assembly chambers.

The contact lenses are made from the mold assembly comprised of the present composition using techniques known to one skilled in the art. The following discussion is exemplary and is described in more detail in a U.S. application assigned Ser. No. 08/258,654 (Attorney Docket No. 9016) of Wallace Martin, et al. for Consolidated Contact Lens Molding, the contents of which are incorporated by reference. The mold front curves and back curve molds described hereinabove are prepared in accordance with the description therein. An emodiment of the present invention has both the front mold half and the back mold half comprised of either the polystyrene/additive or the polypropylene/additive formulations of the present invention or a combination thereof. As described hereinabove, the back curve is preferably comprised of the polystyrene and additive, in accordance with the present invention, while the front curve is preferably made up of only the thermoplastic polymer, preferably polystyrene or polypropylene. It is to be noted in a preferred embodiment, that unlike the back curve mold, the front curve mold does not contain any additive in the thermoplastic polymer.

For efficiency, ease of operation and cycle times, the front curve mold and back curve mold are made using injection molding devices. It is preferred that the thermoplastic material for the front lens and the composition of the present invention for the back mold is provided in the form of pellets or particles of relatively high surface area which have equilibrated fully with available oxygen available in the atmosphere.

Unlike prior practice as described in U.S. Pat. No. 4,565,348, the mold is designed to produce fully formed lens mold parts directly, that is without associated support structure such as a frame; there is in consequence no need to dissociate the part from unneeded polymer material on demolding, and the lens mold parts may be directly collected by automated robotic means for delivery to the transport means. In any given cycle, any number of mold parts may be prepared but for convenience of handling, typically 8 lens mold parts of concave or convex configuration are prepared in a given cycle and transferred by automated robotic means to a pallet of aluminum or stainless steel in which they are received and supported in a regular spatial array adapted for further operations.

It should be understood that at most stages of the continuous process, inspection means are operational to effect rejection of parts against reference criteria; hence, following injection molding, inspection, generally visual, employing photoelectric means, for example, for such defects as haze, mold defect as in configuration due to improper material feed and the like may lead to rejection of a part and thus disposal. To maintain the continuity and consistency in line operations generally a whole mold cycle or pallet of lens mold parts will be expelled from the line following discovery of a defect in any one lens mold part. Each of the pallets contain a unique bar code number for use in pallet tracking and quality control procedures utilizing bar code scanners.

The apparatus for removing and transporting lens mold parts from the mold to the transport means includes hand means for receiving the mold parts and a support subassembly capable of sliding and pivotable movement required for transfer of the mold parts to the horizontally operating transport means.

Figure 2:
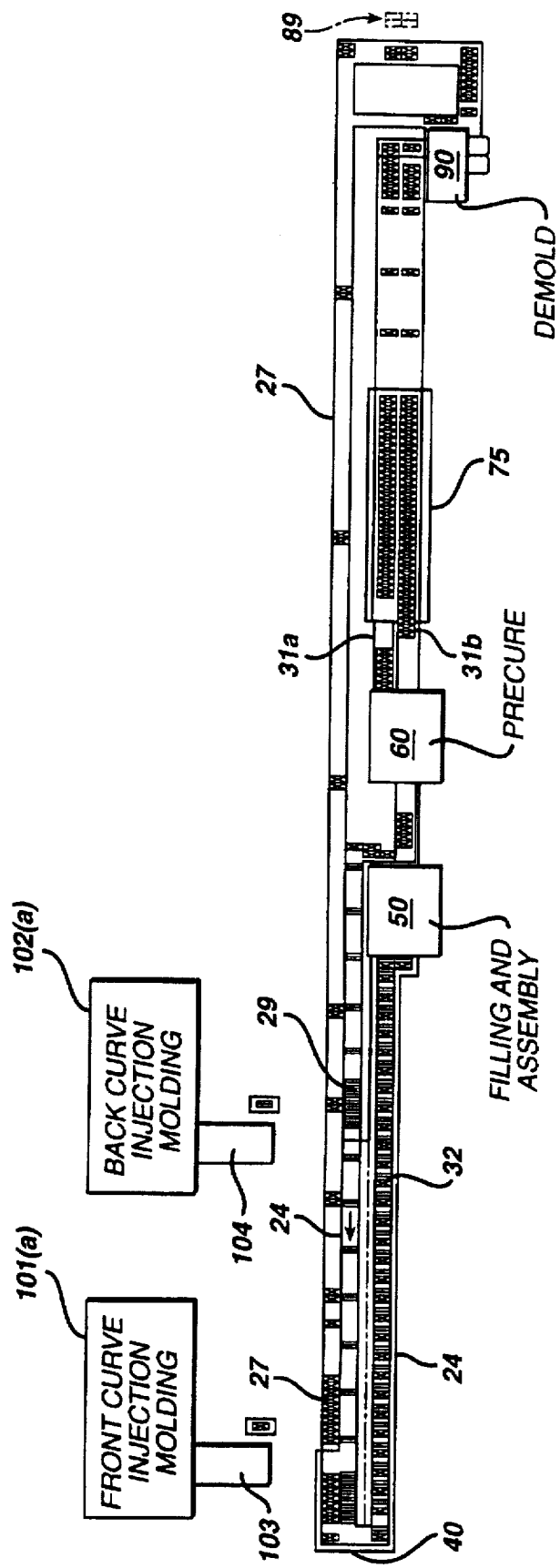
FIG. 2 is a top elevational planar view of the production line system.

As illustrated in FIGS. 1 and 2 injection molds #1 (101a) and #2 (102a), shown at steps 101 and 102 in the flow diagram of FIG. 1, mold respectively front curve and back curve lens mold parts or sections; they may be located in tandem as shown in FIG. 2 or to shorten exposure to the atmosphere still further, they may be located in a common plane intersecting a bifurcated transport line, even perpendicularly oriented thereto in the same plane.

Robotic means 103,104 are provided adjacent the mold registry and engagement station for receiving concave and convex lens molds respectively and transferring said mold part to a low oxygen environment at a high production cycle rate, as noted at step 105.

In the course of or following complete degassing of the lens mold sections as indicated at 106 in FIG. 1, the pallets containing concave and convex lens mold sections are ordered into interleaved relation and degassed on enclosed in feed conveyor such that automated equipment may effect their operative interengagement into molding relation.

The sequencing conveyor 32 including the interleaving station 40 is enclosed and pressurized over its entire length with an inert gas, conveniently nitrogen. The amount of nitrogen is not critical, it being suitable to use just enough nitrogen pressure to effectively exclude the atmosphere under the operating conditions experienced. In the nitrogen tunnel surrounding sequencing conveyor 32 the freshly prepared lens mold blanks are degassed as indicated at step 106 in FIG. 1.

The concave lens molds are filled with the reactive monomer composition at step 107 and the concave and convex lens molds are placed into registry and urged into complementary molding relation. The filling and assembly zone 50 surrounds a portion of the conveying or transport means 32, which delivers to the zone pallets of concave and convex lens mold sections, respectively, and at the terminus of the zone carries pallets of paired and filled molds to the precure zone. The filling and assembly zone illustrated in FIG. 2 at 50 is defined by a geometrically appropriate, transparent enclosure, generally of rectangular cross-section, formed of any suitable thermoplastic or metal and thermoplastic construction.

As illustrated at 107 in FIG. 1, the concave lens mold sections are filled with degassed monomer composition from step 108, and then transported to an assembly module having a vacuum chamber formed intermittently within the nitrogen tunnel in which filled concave lens molds are engaged with convex mold sections in vertical alignment and in mating relation, such that the reactive monomer composition is trapped between the optical surfaces of the respective mold sections and at least partially sealed by the engagement of the parting edge formed peripherally in each of the lens mold sections. The vacuum is released and the mated mold is passed through nitrogen to the precure station, an integral part of the nitrogen tunnel.

The vacuum chamber is formed upon and about a single pallet by the periodic reciprocable motion of apparatus also comprising means for alignment of the seating of the convex mold sections upon the concave mold sections so their axes of rotation are collinear and their respective flanges are parallel. Upon sealing engagement with the pallet the thus formed chamber is evacuated in order to ensure that no gas bubbles are entrapped between and upon the respective optical molding surfaces. The degree of vacuum is selected for the purpose of speeding the assembly of mold parts and removing any gas bubbles at the monomer/mold interface that might otherwise be entrapped in the course of closure between the complementary mold sections.

Following assembly of the mold parts, the incipient lens monomer is precured at step 109 in the precure module 60 of the present invention. The process of the precure involves clamping the mold halves in registration and then precuring the monomer or monomer mixture to a gel like state.

Following precure, the polymerization of the monomer or monomer mixture is completed in curing tunnel 75 as indicated at step 110 with irradiation.

In the cure zone (75), the monomer/diluent mixture is then cured in a UV oven whereby polymerization is completed in the monomer(s). This irradiation with actinic visible or ultraviolet radiation produces a polymer/solvent mixture in the shape of the final desired hydrogel. In addition, the cure zone also has a source of the polymerizable composition to a temperature sufficient to assist the propagation of the polymerization and to counteract the tendency of the polymerizable composition to shrink during the period that it is exposed to the ultraviolet radiation.

After the polymerization process is completed, the two halves of the mold are separated during a demolding step of heating leaving the contact lens in the first or front curve mold half 10, from which it is subsequently removed. It should be mentioned that the front and back curve mold halves are used for a single molding and then discarded or disposed of.

Heating the back curve lens mold creates differential expansion of the heated mold polymer relative to the cooler lens polymer which shifts one surface with respect to the other. The resultant shear force breaks the polymerized lens/polymer mold adhesion and assists in the separation of mold portions. The greater the temperature gradient between the surfaces of the mold portions, the greater the shearing force and the easier the mold portions separate. This effect is greatest when there is maximum thermal gradient. As time continues, heat is lost through conduction from the back mold portion into the lens polymer and the front mold portion, and then collectively into the surrounding environment. The heated back mold portion is, therefore, promptly removed so that very little energy is transferred to the polymer lens, avoiding the possibility of thermal decomposition of the lens. The heating may be accomplished by techniques known to one skilled in the art such as by steam, hot air, laser, infrared and the like. The process of laser demolding is described in U.S. Pat. No. 5,294,379 to Ross et al, the contents of which are incorporated by reference.

If the heating step is hot air or steam, after the heating step, the back curve is pryed from the front curve and mold in the mold assembly, as indicated at Step 111. If on the other hand, the heating is by laser or infrared, no prying is used and the back curve separates spontaneously from the front curve.

The demolding assemblies of the mold separation apparatus 90 each physically pry the back curve mold half 30 from the front curve half 10 of each contact lens mold to physically expose each contact lens situated in the lens mold for conveyance to a hydration station for hydration of the lenses. The prying process occurs under carefully controlled conditions, so that the back curve half 30 will be separated from the front curve half 10 without destroying the integrity of the lens formed in the lens mold.

After the mold assemblies have been separated in the demold apparatus 90, each pallet containing the front curve mold halves with an exposed polymerized contact lens therein, is subsequently transported to a hydration station for hydration and demolding from the front curve lens mold, inspection and packaging, as indicated at Step 112.

In the processes described hereinabove, when the base mold does not contain the additive therein, there were many occasions when the lenses that were formed were unusable because they contained defects, such as chips or edge tears or holes, i.e., voids in the center of the cast lenses. These defects were caused during the demolding process and were noticed when the base curve was separated from the front curve using the prying mechanisms described hereinabove. However, when the additive is present in the back curve, demolding is facilitated and the back curve is more easily removed. As a result, there are greatly reduced instances of lens damage during the demolding step, in which the back curve is separated from the front curve and the lens, which stays in the front curve. Without wishing to be bound, it is believed that the additive in the back curve modifies the adhesion force between the lens and the base curve. For example, when polystyrene alone is used, it adheres very strongly to the polymeric material of the lens; however, when the additive is added to the polystyrene, the presence of the additive weakens the friction forces between the polystyrene and the lens material, making it easier to separate the back curve from the lens and the front curve mold. Thus, there is less stress on the lens surface during demolding, making it easier to separate. Thus in a prying action between the lens mold halves, as occurs during demolding, the lens will slip more easily from the convex mold half. Consequently, when the back curve is made up of the formulation of the present invention, separating the back curve from the front curve and the lens has become facile. Consequently, less stringent conditions are required for demolding than that used heretofore. In fact, in certain embodiments such as with ABIL WAX 9801, demolding occurs without the temperature gradient thus eliminating the necessity of heat in the demolding step. Thus, using the compositions of the present invention to separate the back curve from the mold assembly, lenses can be demolded in good yields right after the demold tunnel at lower temperature, such as about 60° to 70° C. For example, the coating of polystyrene with a 4% level of ABIL Wax 9801, lower temperatures, such as 6°–75° C., are used to demold the lenses in good yields.

However, the additive also serves a dual purpose, it reduces the number of lenses that are produced having holes in the lens. Without wishing to be bound, it is believed that the additive is also acting as a surfactant or wetting agent. In its absence, there may be localized areas at the interface between the mold surface and the polymerized monomer where the surface tension therebetween may become so great that as a result, a space would develop in the contact lens between the polymerized mass and the mold surface. These spaces allow air to be trapped between the back curve and the monomer, resulting in an air bubble which formed holes in the resulting contact lens upon curing. However, the addition of the additive changes the surface chemistry by improving the wetting of the surface and reducing the surface tension sufficient to allow intimate contact between the mold half and the polymerized monomer. The improved wetting s readily achieved by increasing the surface energy of the convex mold half through modification of the base resin through additive inclusion. No spaces are formed and after curing, the lens do not develop any holes. The improved wetting of the convex mold half by the lens material greatly reduces holes.

Thus, the additive in the polystyrene forms two functions, it acts as a surfactant and simultaneously decreases the adhesion forces between the back curve mold and the polymerized monomer and the front curve Unless indicated to the contrary, the molecular weights are in units of grams per mole. Moreover, unless indicated to the contrary, the percentages are given in weight percentages.

The present invention is more specifically described by the following illustrative examples. However, it is to be understood that these examples are only described to illustrate the invention, but not to limit the scope of the present invention.

EXAMPLE 1

Various soft contact lenses were prepared in accordance with the above procedures utilizing a back mold half made of either polystyrene or polystyrene and additive as described hereinabove. After the mold halves were pryed apart, the percentage of holes in the contact lens produced by that mold was determined. The results are tabulated hereinbelow.

| Type of Material | % of Holes |
| --- | --- |
| 1. Polystyrene | 5.4 |
| 2. Polystyrene | 3.8 |
| 3. Polystyrene | 1.8 |
| 4. Polystyrene | 3.2 |
| 5. Polystyrene + 1% Abilwax 9801 | 0.1 |
| 6. Polystyrene +¼% SF1080 | 0.5 |
| 7. Polystyrene + 3% Axelwax 33 RD | 0.9 |
| 8. Polystyrene + 1% FC430 | 1.2 |
| 9. Polystyrene + 2.0% Axelwax 38H | 0.4 |

As readily shown, there were significantly less holes in the contact lens when the back mold contained an internal additive.

EXAMPLE 2

Figure 5:
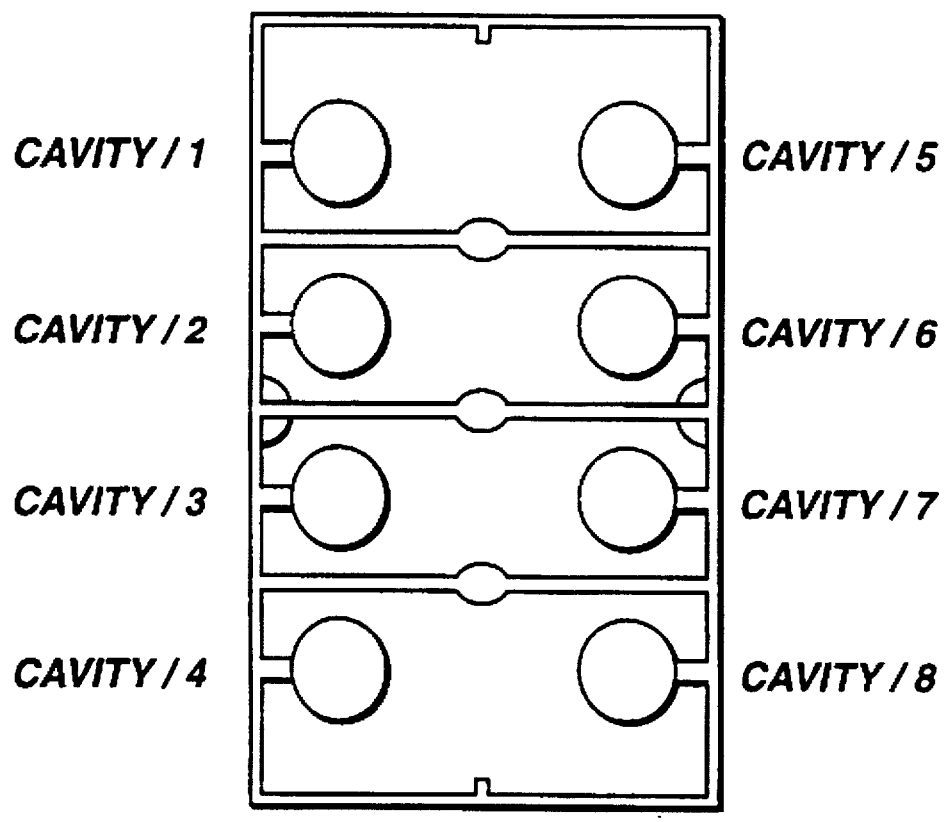
FIG. 5 is a base curve frame of 8 mold halves (cavities) supported and registered in a pallet comprised of various formulations, as described in Example 2.

Frames were molded on a 60-ton Nestal from the candidate formulations listed hereinbelow in Table 2, in accordance with the procedure described herein. As described herein, and shown in FIG. 5, the pallet contained 8 base mold halves (cavities) arranged as depicted therein. The mold halves were comprised of the various formulations described hereinbelow and contact lens were prepared in accordance with the procedure described herein.

The frame parameters are presented in the following Table.

TABLE 1

FRAME ANALYSIS

| | | C-1 | C-3 | C-6 | C-8 |
|---|---|---|---|---|---|
| HUNTSMAN 202 (Polystyrene) | | | | | |
| FRAME #1 | RADIUS | 8.447 | 8.447 | 8.461 | 8.444 |
| | P/V | 0.857 | 4.576 | 4.368 | 1.898 |
| FRAME #2 | RADIUS | 8.448 | 8.457 | 8.417 | 8.419 |
| | P/V | 0.891 | 3.742 | 4.511 | 0.986 |
| FRAME #3 | RADIUS | 8.449 | 8.461 | 8.448 | 8.402 |
| | P/V | 0.958 | 4.250 | 2.581 | 8.843 |
| HUNTSMAN 202/PVDF (Polystyrene) | | | | | |
| FRAME #1 | RADIUS | 8.872 | 8.881 | 8.879 | 8.875 |
| | P/V | 0.653 | 0.557 | 0.595 | 0.653 |
| FRAME #2 | RADIUS | 8.879 | 8.888 | 8.887 | 8.877 |
| | P/V | 0.821 | 0.631 | 0.549 | 0.552 |
| FRAME #3 | RADIUS | 8.859 | 8.816 | 8.879 | 8.872 |
| | P/V | 0.545 | 2.796 | 1.323 | 2.297 |
| HUNTSMAN 202/0.2225% SF1080 (Silicone Oil) | | | | | |
| FRAME #1 | RADIUS | 7.855 | 7.861 | 7.871 | 7.858 |
| | P/V | 0.561 | 0.677 | 0.396 | 0.859 |
| FRAME #2 | RADIUS | 7.857 | 7.862 | 7.869 | 7.854 |
| | P/V | 0.856 | 0.450 | 0.578 | 0.695 |
| FRAME #3 | RADIUS | 7.855 | 7.861 | 7.870 | 7.858 |
| | P/V | 0.579 | 0.724 | 0.214 | 0.900 |

FINAL ANALYSIS

| | | C-1 | C-3 | C-6 | C-8 |
|---|---|---|---|---|---|
| HUNTSMAN 202/0.5% SF1080 (Silicone Oil) | | | | | |
| FRAME #1 | RADIUS | 7.858 | 7.857 | 7.865 | 7.853 |
| | P/V | 0.526 | 0.557 | 0.442 | 0.560 |
| FRAME #2 | RADIUS | 7.856 | 7.859 | 7.867 | 7.854 |
| | P/V | 0.621 | 0.428 | 0.335 | 0.449 |
| FRAME #3 | RADIUS | 7.856 | 7.862 | 7.867 | 7.854 |
| | P/V | 0.539 | 0.552 | 0.388 | 0.554 |

LEGEND:
C-1 cavity ONE of the pallet
C-3 cavity THREE of the pallet
C-6 cavity SIX of the pallet
C-8 cavity EIGHT of the pallet
P/V peak to valley roughness, an interferometric measurement
PVDF polyvinylidene fluoride In Table 1, P/V is a roughness measurement, wherein a lower number is a better result. The C-legend refers to the cavity in a frame so that the data as presented eliminates cavity variations.

As can readily be seen from the data in Table 1, in all cases, when the additive, such as SF 1080 was present in the mold, the P/V value were significantly lower than in its absence. Thus, the data clearly show that the frames using a mold containing the additive produced smoother lenses.

EXAMPLE 3

Frames manufactured from sample candidate formulations plus a control, indicated in the key to Table 2, were prepared on the Acuvue Pilot lens to manufacture lenses in accordance with the procedure described in the present specification. The summaries are presented in Table 2.

TABLE 2

| | % of Edge Defects | | TOTAL CHIPS |
|---|---|---|---|
| SET # | CHIP | TEAR | AND TEARS % |
| I | 44.50 | 1.90 | 46.40 |
| II | 20.40 | 1.10 | 21.50 |
| III | 17.40 | 2.20 | 19.60 |
| IV | 13.80 | 0.00 | 13.80 |
| V | 14.10 | 2.20 | 16.30 |
| VI | 11.50 | 6.30 | 17.80 |
| VII | 22.50 | 15.00 | 37.50 |
| VIII | 32.50 | 5.00 | 37.50 |
| IX | 5.00 | 15.00 | 20.00 |
| X | 10.00 | 10.00 | 20.00 |
| XI | 21.60 | 5.40 | 27.00 |
| XII | 27.50 | 10.00 | 37.50 |

KEY
I HUNTSMAN 202 ps
II 0.5% GE SF1080
III 0.25% GE SF1080
IV 1.0% ABILWAX 9801
V 4.0% ABILWAX 9801
VI 0.25% 3M FC430
VII 2.5% AXEL 33
VIII 0.25% AXEL 33
IX 2.5% AXEL 33
X 0.25% AXEL 38
XI 1.50% KANTSTIK Q
XII 0.25% KANTSTIK Q

As can be readily seen by the data in Table 2, the total amount of edge defects (chips and tears) is the lower in all cases and significantly lower in many cases when the additive is present.

EXAMPLE 4

In this set of experiments, a study was conducted to evaluate the demolding of different compounds plus a standard polystyrene as base curves.

The lenses (14.0 Acuvue formulation) were processed on the WK Maximize lab line in accordance with the procedure described herein using vacuum deposition and 30 sec UV pre-cure under weight. They had additional four minutes of UV cure without weight at 60° in the simulated tunnel. The frames were kept thermostated in an oven with hot air circulation ±1.5° C. prior to demold, transferred to an aluminum pallet kept at the same temperature and demolded immediately after the WK lab demolder mark 1 which simulates the movement of the mark 1 demolder at present installed in the Maximize pilot line at Vistakon.

| No steam was applied. | | | |
|---|---|---|---|
| Movement: | 3.5 deg | 0.5 sec | fast |
| | 6.0 deg | 3.0 sec | slow |
| | 15 deg | 4.4 sec | slow (end fast) |

One side was pryed apart. The frames were inspected in a stereomicroscope at 10× immediately after demold. Broken BC flanges, lens lift, missing lenses and tears were recorded. Results from this demold inspection are shown in Table 3.

All lenses, except those with broken flanges, were hydrated in simulated Maximize process: 5 mins at 70° C., 0.05% Tween 80 in D1-water, followed by 3 mins in D1-water+storage overnight in buffered saline.

The lenses were inspected for visual defects in a DL2 using the Vistakon pilot line standards. The conditions are indicated in Table 3.

TABLE 3

| MATERIAL | % CH + TR* | % HO |
|---|---|---|
| Polystyrene | 20 | 3 |
| Polystyrene/GE 1080 0.5% | 20 | 3 |
| Polystyrene/ABILWAX 9801, 1%** | 8 | 2 |
| Polystyrene/ABILWAX 9801, 4% | 10 | 2 |

*Avg. valve of 3 runs
**only 1 run was performed
Key
CH = Chips
HO = Holes
TR = Tears As clearly shown by the data, a preferred embodiment in this run is the mold of polystyrene with ABILWAX, i.e., silicone wax which produced contact lenses having significantly less chips and tears therein than when the molds were comprised of polystyrene alone.

The above preferred embodiments and examples are given to illustrate the scope and spirit of the present invention. The embodiments and examples described herein will make apparent to those skilled in the art other embodiments and examples. These other embodiments and examples are within the contemplation of the present invention. Therefore, the present invention should be limited only by the appended claims.

What is claimed is:

1. A mold material constituting a mold half for use in the production of contact lenses, said mold material comprising a thermoplastic polymer and an internal additive which is impregnated into said thermoplastic material by compounding said internal additive and said thermoplastic polymer, said internal additive is present in amounts ranging from about 0.1% to about 20% by weight, said thermoplastic material being polystyrene or polypropylene and said additive being a polyethylene or polypropylene wax having a molecular weight ranging from about 5,000 to about 200,000, stearate salt, a glycerol ester having a molecular weight of about 200–2,000, an amide wax of the formula $R_1CONH_2$, wherein $R_1$ is a hyrocarbyl group, and the amide wax has a molecular weight ranging from about 2,000 to about 100,000, Montan wax, oxidized wax, fatty acid having a molecular weight of about 200 to 2,000, a complex ester or a combination thereof.

2. The mold material of claim 1 in which the amide wax is a fatty acid amide wax.

3. The mold material of claim 1 wherein the thermoplastic polymer is polystyrene.

4. The mold material of claim 1 wherein the thermoplastic polymer is polypropylene.

5. The mold material of claim 1 wherein the additive is present in amounts ranging from 0.1 to 5% by weight.

6. The mold material of claim 5 wherein the additive is present in amounts ranging from 0.1 to 2% by weight.

7. The mold material of claim 1 wherein the additive is stearate salt or silicone.

8. A mold half useful in the production of a contact lens by the polymerization of a polymerizable composition in a mold assembly comprised of said mold half and a second mold half, said mold half comprising an integral article having a central curved section defining a concave surface, a convex surface and a circumferential edge, at least the central portion of at least one of said concave surface and said convex surface having the dimensions of the back curve of the desired swelled or unswelled contact lens to be produced in said mold assembly and being sufficiently smooth and contoured so that the surface of said contact lens formed by polymerization of said polymerizable composition in contact with said surface is optically acceptable, said article having an annular flange integral width and surrounding said circular circumferential edge and extending therefrom in a plane normal to the axis of said concave surface, said article also having a generally triangular tab situated in a plane normal to said axis and extending from said flange, said article having a thinness and rigidity effective to transmit heat therethrough and to withstand prying forces applied to separate said mold half from said mold assembly, and said article being comprised of a composition comprising a thermoplastic polymer and an internal additive which is impregnated into said thermoplastic material by compounding. said internal additive and said thermoplastic polymer, said internal additive is present in amounts ranging from about 0.1% to about 20% by weight, said thermoplastic material being polystyrene or polypropylene and said additive being a polyethylene or polypropylene wax having a molecular weight ranging from about 5,000 to about 200,000, stearate salt, a glycerol ester having a molecular weight of about 200–2,000, an amide wax of the formula $R_1CONH_2$, wherein $R_1$ is a hydrocarbyl group, and the amide wax has a molecular weight of about 200–2,000, silicone having a molecular weight ranging from about 2,000 to about 100,000, Montan wax, oxidized wax, fatty acid having a molecular weight of about 200 to about 2,000, a complex ester or a combination thereof.

9. The mold half of claim 8 wherein the amide wax is a fatty acid amide wax.

10. The mold half of claim 8 wherein the thermoplastic polymer is polystyrene.

11. The mold half of claim 8 wherein the thermoplastic polymer is polypropylene.

12. The mold half of claim 8 wherein the additive is present in amounts ranging from 0.1 to 5% by weight.

13. The mold material of claim 12 wherein the additive is present in amounts ranging from 0.1 to 2% by weight.

14. The mold half of claim 8 wherein the additive is stearate salt or silicone.

15. A mold assembly used in the production of a contact lens by the polymerization of a polymerizable composition in said mold assembly, said mold assembly comprising a front mold half and a back mold half in contact therewith thereby defining and enclosing a cavity therebetween, and a polymerizable composition in said cavity in contact with both mold halves, wherein said front mold half comprises a first article of thermoplastic polymer transparent to ultraviolet light, said article having a central curved section with a concave surface, a convex surface and a circular circumferential edge, wherein the portion of said concave surface in contact with said polymerizable composition has the curvature of the front curve of a contact lens to be produced in said mold assembly, and is sufficiently smooth so that the surface of a contact lens formed by polymerization of said polymerizable composition in contact with said surface is optically acceptable;

said first article having an annular flange integral with and surrounding said circular circumferential edge and extending therefrom in a plane normal to the axis of said concave surface, and generally triangular tab situated in a plane normal to said axis and extending from said flange;

said back mold comprised of an integral article having a central curved section with a concave surface, a convex surface and a circular circumferential edge, wherein the portion of said convex surface in contact with said polymerizable composition has the curvature of the back curve of a contact lens to be produced in said mold assembly and is sufficiently smooth that the surface of a contact lens formed by polymerization of said polymerization composition in contact with said surface is optically acceptable;

said second article having an annular flange integral with and surrounding said circular circumferential edge with and surrounding said circular circumferential edge and extending therefrom in a plane normal to the axis of said convex surface, and a generally triangular tab situated in a plane normal to said axis and extending from said flange wherein the convex surface of said back mold half contacts the circumferential edge of said front mold half;

said back mold being comprised of a composition comprising a thermoplastic polymer and an internal additive which is impregnated into said thermoplastic material by compounding said internal additive and said thermoplastic polymer, said internal additive is present in amounts ranging from about 0.1% to about 20% by weight, said thermoplastic material being polystyrene or polypropylene, and said additive being a polyethylene or polypropylene wax having a molecular weight ranging from about 5,000 to about 200,000, stearate salt, a glycerol ester having a molecular weight of about 200–2,000, an amide wax of the formula $R_1CONH_2$, wherein $R_1$ is a hydrocarbyl group, and the amide wax has a molecular weight of about 200–2,000, silicone having a molecular weight ranging from about 2,000 to about 100,000, Montan wax, oxidized wax, fatty acid having a molecular weight of about 200 to about 2,000, a complex ester or a combination thereof.

16. The mold assembly of claim 15 in which the amide wax is a fatty acid amide wax.

17. The mold assembly of claim 15 wherein the thermoplastic polymer is polystyrene.

18. The mold assembly of claim 15 wherein the thermoplastic polymer is polypropylene.

19. The mold assembly of claim 15 wherein the additive is present in amounts ranging from 0.1 to 5% by weight.

20. The mold assembly of claim 19 wherein the additive is present in amounts ranging from 0.1 to 2% by weight.

21. The mold assembly of claim 15 wherein the additive is stearate salt or silicone.

22. In an improved process for forming a contact lens from a mold assembly comprising a front mold half and a back mold half in contact therewith thereby defining and enclosing a cavity therebetween, and containing in said cavity a polymerizable composition in contact with said mold halves;

said front mold half comprising a first article of thermoplastic polymer transparent to ultraviolet light, said article having a central curved section with a concave surface, a convex surface and a circular circumferential edge, wherein the portion of said concave surface in contact with said polymerizable composition has the curvature of the front curve of a contact lens to be produced in said mold assembly and is sufficiently smooth so that the surface of a contact lens formed by polymerization of said polymerizable composition in contact with said surface is optically acceptable;

said back mold half comprising a second article of thermoplastic polymer transparent to ultraviolet light, said article having a central curved section with a concave surface, a convex surface and a circular circumferential edge, wherein the portion of said convex surface in contact with said polymerizable composition has the curvature of the back curve of a contact lens to be produced in said mold assembly and is sufficiently smooth so that the surface of a contact lens is formed by polymerization of said polymerizable composition in contact with said surface is optically acceptable, wherein the convex surface of said back mold contacts the circumferential edge of said front mold half;

and the front mold half is clamped against the back mold half;

and the polymerizable composition undergoes polymerization under precuring and curing conditions with ultraviolet light and the back curve is separated from the front curve and the contact lens during a demolding process and the front curve is subsequently separated from the contact lens, the improvement comprising utilizing a back curve mold that is comprised of a composition comprising a thermoplastic polymer and an internal additive which is impregnated into said thermoplastic material by compounding said internal additive and said thermoplastic polymer, said internal additive is present in amounts ranging from about 0.1% to about 20% by weight, said thermoplastic material being polystyrene or polypropylene, and said additive being a polyethylene or polypropylene wax having a molecular weight ranging from about 5,000 to about 200,000, stearate salt, a glycerol ester having a molecular weight of about 200–2,000, an amide wax of the formula $R_1CONH_2$, wherein $R_1$ is a hydrocarbyl group, and the amide wax has a molecular weight of about 200–2,000, silicone having a molecular weight ranging from about 2,000 to about 100,000, Montan wax, oxidized wax, fatty acid having a molecular weight of about 200 to about 2,000, a complex ester or a combination thereof.

23. The process of claim 22 in which the amide wax is a fatty acid amide wax.

24. The process of claim 22 wherein the thermoplastic polymer is polystyrene.

25. The process of claim 22 wherein the thermoplastic polymer is polypropylene.

26. The process of claim 22 wherein the additive is present in amounts ranging from 0.1 to 5% by weight.

27. The process of claim 26 wherein the additive is present in amounts ranging from 0.1 to 2% by weight.

28. The process of claim 22 wherein the additive is stearate salt or silicone.

* * * * *

UNITED STATES PATENT AND TRADEMARK OFFICE
CERTIFICATE OF CORRECTION

PATENT NO. : 5,690,865
DATED : November 25, 1997
INVENTOR(S) : Ture Kindt-Larsen, Jeffrey Longo, Keith O'Brien It is certified that error appears in the above-identified patent and that said Letters Patent is hereby corrected as shown below:

In Claim 1, line 45, after "weight" insert -- of about 200-2000, silicone having a molecular weight --.

Signed and Sealed this

Twenty-sixth Day of May, 1998

Attest:

BRUCE LEHMAN

Attesting Officer

Commissioner of Patents and Trademarks